(12) United States Patent
Wagner et al.

(10) Patent No.: US 7,757,212 B2
(45) Date of Patent: Jul. 13, 2010

(54) SYSTEM AND METHOD FOR MANAGING CROSS PROJECT DEPENDENCIES AT DEVELOPMENT TIME

(75) Inventors: Timothy Allen Wagner, Seattle, WA (US); Jess Garms, Seattle, WA (US); Timothy Hanson, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 1449 days.

(21) Appl. No.: 10/983,391

(22) Filed: Nov. 8, 2004

(65) Prior Publication Data

US 2005/0262488 A1    Nov. 24, 2005

Related U.S. Application Data

(60) Provisional application No. 60/573,436, filed on May 21, 2004.

(51) Int. Cl.
*G06F 9/44* (2006.01)
(52) U.S. Cl. .................... 717/120; 717/101; 717/102; 717/103
(58) Field of Classification Search .................... None
See application file for complete search history.

(56) References Cited

U.S. PATENT DOCUMENTS

| | | | |
|---|---|---|---|
| 5,758,160 A | 5/1998 | McInerney et al. | |
| 6,178,547 B1 | 1/2001 | Pennello | |
| 6,493,868 B1 | 12/2002 | Dasilva et al. | |
| 7,055,130 B2* | 5/2006 | Charisius et al. | 717/108 |
| 7,111,280 B2 | 9/2006 | Levien et al. | |
| 7,263,695 B1* | 8/2007 | Muzaffar et al. | 717/162 |
| 7,283,991 B1 | 10/2007 | Kimmerly | |
| 2003/0187669 A1 | 10/2003 | Hassinger et al. | |
| 2004/0261055 A1* | 12/2004 | Bertelrud et al. | 717/106 |

FOREIGN PATENT DOCUMENTS

WO    9857260 A1    12/1998

OTHER PUBLICATIONS

Tim Deboer et al., "J2EE Class Loading Demystified", Nov. 12, 2008, pp. 1-10; http://www.ibm.com/developerworks/websphere/library/techarticles/0112_deboer/deboer....
Office Action, dated Apr. 28, 2010, issued in Corresponding U.S. Appl. No. 10/983,794.

* cited by examiner

*Primary Examiner*—Insun Kang
(74) *Attorney, Agent, or Firm*—Squire, Sanders & Dempsey, LLP

(57) ABSTRACT

A method for responding to a change in source code, said method comprising: interconnecting a plurality of nodes to form a graph data structure wherein the graph embodies at least one dependency between a plurality of software projects; traversing the graph to identify dependent code affected by the change; evaluating the identified dependent code; and wherein the changed source code is from a first software project and the identified dependent code is from a second software project.

10 Claims, 5 Drawing Sheets

SYSTEM AND METHOD FOR MANAGING CROSS PROJECT DEPENDENCIES AT DEVELOPMENT TIME

CLAIM OF PRIORITY

This application claims priority from the following application, which is hereby incorporated by reference in its entirety:

U.S. Provisional Patent Application No. 60/573,436, entitled SYSTEM AND METHOD FOR MANAGING CROSS PROJECT DEPENDENCIES AT DEVELOPMENT TIME, filed May 21, 2004.

CROSS-REFERENCE TO RELATED APPLICATION

This application is related to the following co-pending application which are each hereby incorporated by reference in their entirety:

U.S. patent application Ser. No. 10/983,794 entitled SYSTEM AND METHOD FOR MANAGING CROSS PROJECT DEPENDENCIES AT DEVELOPMENT TIME, by Paul Patrick et al., filed Nov. 8, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to software development, compilation systems, and integrated software development environments.

BACKGROUND

Software developers typically use software components when developing an application in order to maximize reuse of logic, decrease development time, and reduce testing time. Components are reusable pieces of software which can be separately packaged. Examples of components include, but are not limited to, libraries, controls, widgets, and Enterprise JavaBeans™. Components can supply basic functionality like string manipulation, mathematical operations, and input/output operations to name a few. Components can be assembled into applications or larger components. Components expose the functionality they implement through a set of application programming interfaces (APIs). The use of these APIs by an application establishes a dependency between the application and one or more components.

Although components simplify the development of applications, they increase the complexity of project configuration. Integrated development environments (IDEs) typically use projects as logical containers for the code associated with an application. A project can include references to components used in the project. The references generally provide the locations of pre-built components on the developer's system and may be provided to an IDE when the developer configures the project, for example. The locations can be used by the IDE to access components and obtain information about their APIs. The IDE can use this information to provide features, such as statement completion and dynamic syntax checking as the developer implements the application.

When building a component, the developer can choose whether to create a separate project for the component or to include the component in the application's project. This choice effects the project's visibility into changes made to the component. When a component is built in a separate project, the application's project can only see and reference changes to the component after the component is rebuilt. IDE features such as dynamic syntax checking and statement completion will use the compiled version of the component and will not provide information about recent changes to the component until it is rebuilt. Another effect of component changes not being visible to dependent projects is the creation of compile time and run time errors. These result from the developer believing that the application code and the components it uses are consistent since the IDE does not display errors. But when the code is compiled or executed, the application improperly attempts to call the modified component through its old interface resulting in errors.

Alternately, the application developer may include the component directly in the application's project. This project configuration provides immediate visibility into changes to the component but may result in undesirable dependencies between the component and the application thereby reducing the ability to reuse the component in other applications. In addition, copying components into all the projects that use them results in an inefficient use of storage and complicates deployment of component changes.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to one skilled in the art that the invention may be practiced without these specific details. In other instances, well-known features have not been described in detail so as not to obscure the invention.

Figure 1:
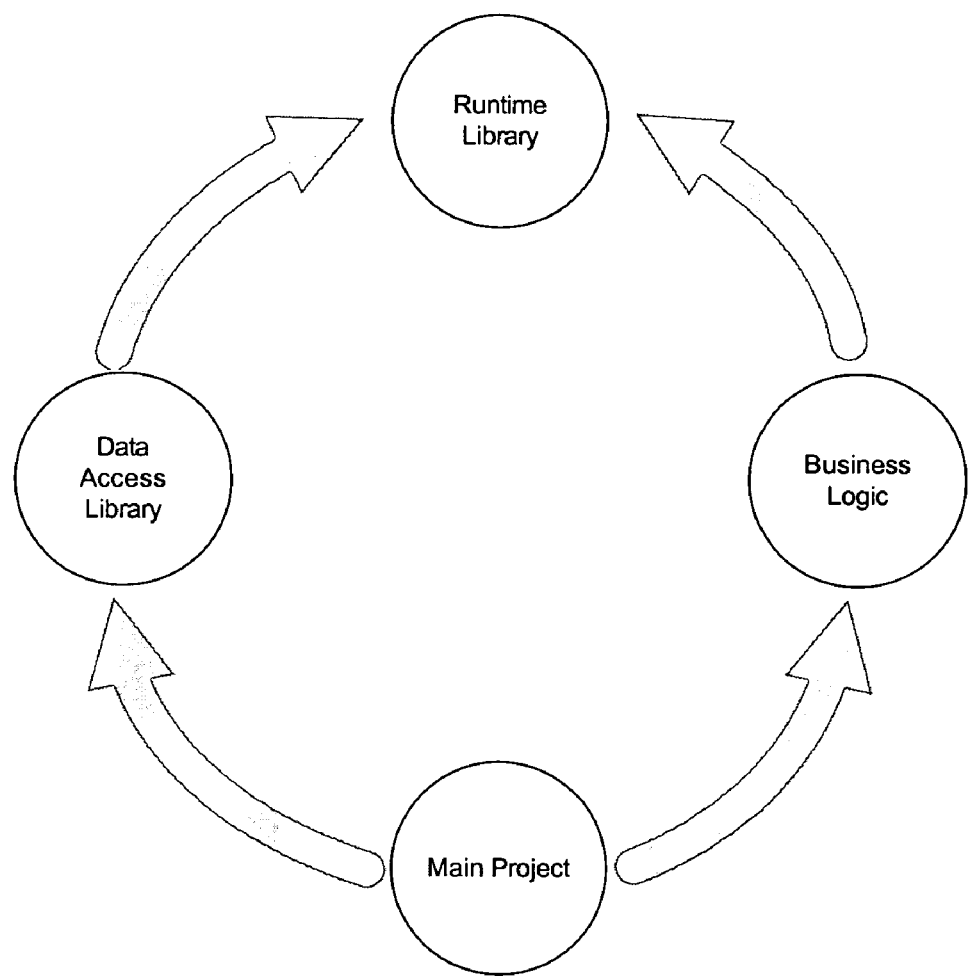
FIG. 1 is an illustration of an exemplary dependency graph.

An application can depend on multiple components within different projects and each of those components may also have dependencies on other components within other projects. Each component's project may in turn have dependencies on other components' projects. This chain might end with the runtime library for the target computing system. In various embodiments, a dependency graph provides a way to determine how projects are interrelated. A simplified diagram is shown in FIG. 1. In this figure, the main project depends on a data access library and a business logic component. These, in turn, depend upon a system runtime library.

Systems and methods in accordance with embodiments of the present disclosure overcome the problems described above by efficiently tracking the relationships between a project and changes to source code for components upon which the project's application depends. It will be appreciated by those of skill in the relevant art that the embodiments of the present disclosure are not dependent on or limited by the particular programming language(s) found in the source code.

In various embodiments, a project dependency data structure can represent the dependencies of projects on components. In aspects of these embodiments, this data structure is a directed acyclic graph (DAG) formed by references between class path level nodes (CPLs). CPLs model the ordered dependencies of a set of projects and the individual components and files within the projects. CPLs are coupled with a dependency resolution mechanism that ensures dependent projects reflect the latest versions of components.

Figure 2:
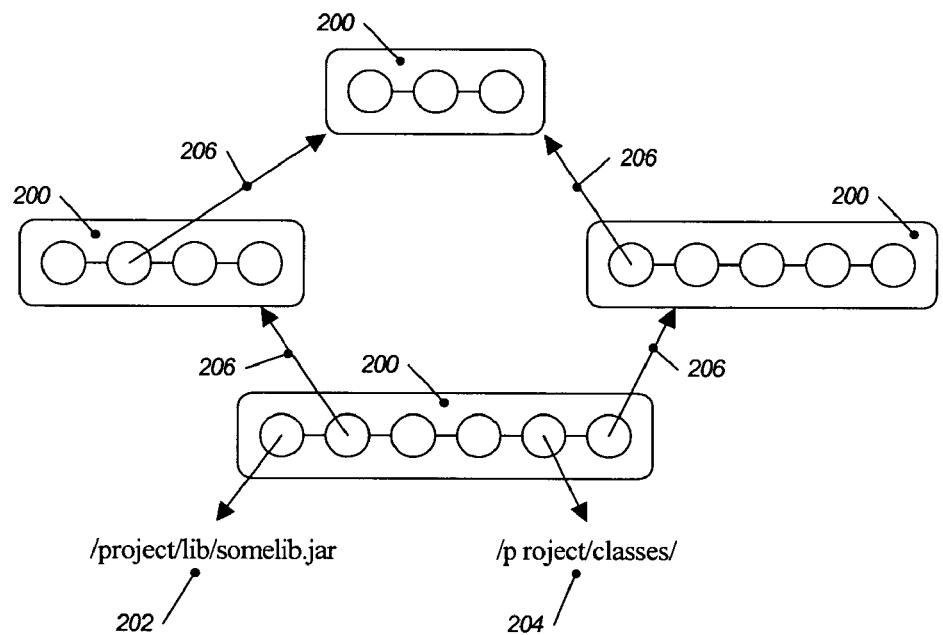
FIG. 2 is an illustration of an exemplary graph containing CPL nodes in accordance to various embodiments.

FIG. 2 provides an exemplary illustration of a project dependency data structure in accordance to various embodiments. In various embodiments and by way of illustration, each project has a CPL 200. A CPL can hold a list of source files associated with a project and one or more binary paths. A binary-path is an ordered list that can include references to jar files 202, locations of binary (e.g., ".class") files 204, and references to other CPLs 206. The order of elements in the binary path has significance, since it establishes a search priority. A reference to a CPL in a binary path indicates that a project depends on the code in another project (source code or binary code).

The project dependency data structure provides optimizations for commonly used components. Many applications and components may depend upon one or more commonly used components and in the absence of the present invention copies of commonly used components are often stored inefficiently with every project that uses the component. For example, most or all components depend on the runtime library of the target computing system and a copy of this library may be included with every component project. However, the software analysis system can utilize the project dependency data structure to maintain a single copy of each common component used across all the projects. This saves space and reduces the time required to build the projects.

As described in the previous paragraph, different projects might refer to the same resource. In conventional software development environments, when several projects are loaded simultaneously, it is common for a development environment to create duplicate in-memory representations for each resource that was referred to by multiple projects. This increased the memory and CPU utilization of the compilation system. The project dependency data structure also allows a compilation or other system to understand the common dependencies across projects and load a single version of each shared resource.

The project dependency data structure also serves as a hierarchy for specifying the resources a project depends on. In conventional software development environments, projects specified the resources they depended on with a flat list. In cases where project A depended on project B, which depended on project C, project A was required to specify all resources required by projects A, B and C in a single list. Project B was required to specify all resources required by projects B and C in a single list. Therefore, any resource required by project C had to be duplicated in the flat lists associated with projects A, B and C. As changes occur to these separate projects, keeping these lists synchronized could be a challenge. A common problem was for projects A, B and C to end up referring to different, incompatible versions of the same resource.

In various embodiments, the software analysis system can locate resources available to the project (e.g., files, directories, data types, etc.). In aspects of these embodiments, this is easily accomplished by searching a project dependency data structure. By way of illustration, suppose a process wants to find information about a type given its type name. Type information is stored in a source file or an object file (e.g., a class). If it exists, a source file is considered the most up-to-date version of type information and will be used instead of the class file. Otherwise, the class file can be used.

Figure 3:
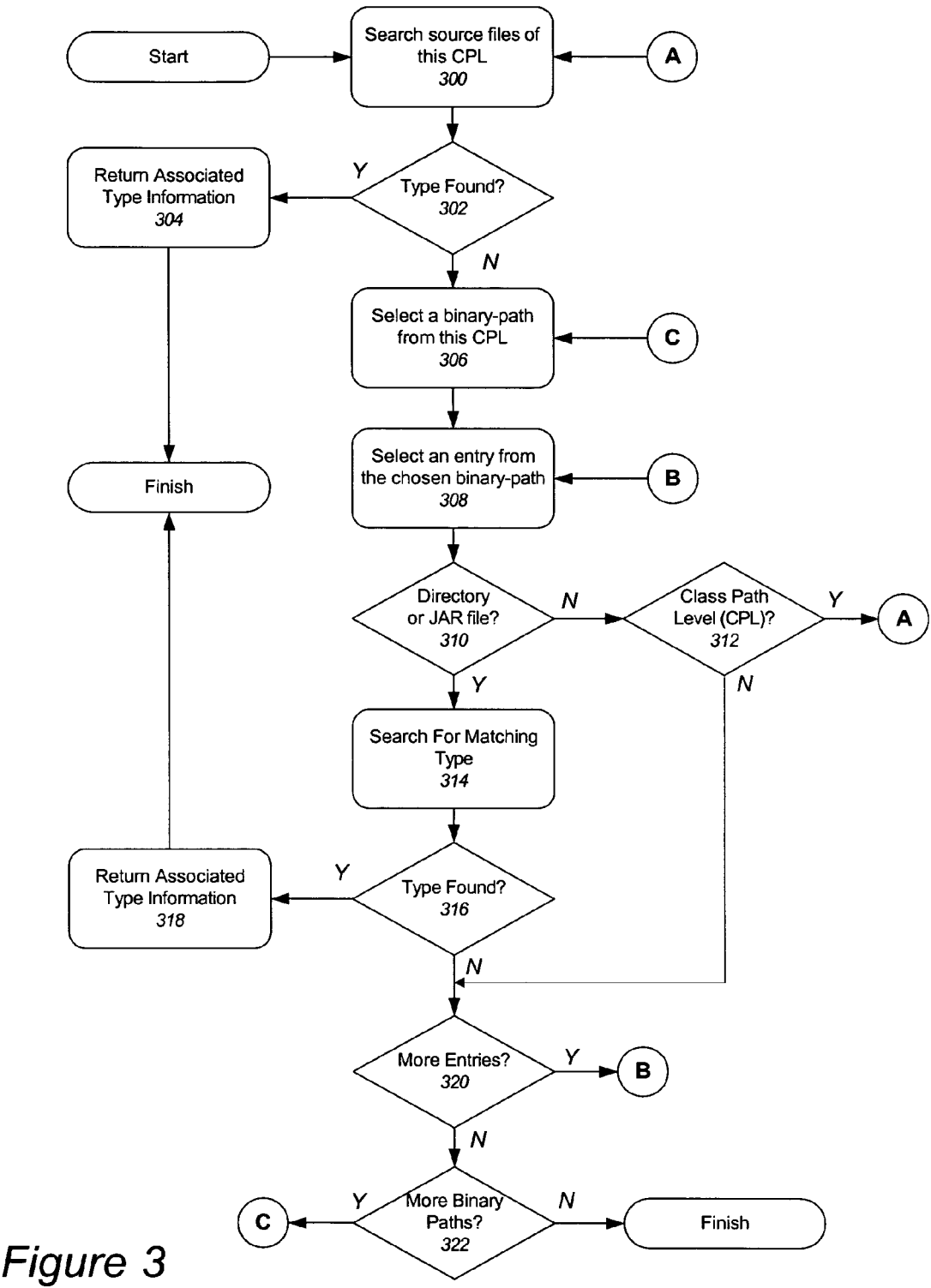
FIG. 3 is an illustration of an exemplary recursive algorithm for searching a project dependency data structure for type information in accordance to various embodiments.

FIG. 3 is an illustration of an exemplary recursive algorithm for searching a project dependency data structure for type information in accordance to various embodiments. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

The benefit of this process is immediate visibility of source file changes in an external project, like that available for source files internal to the project. Similar benefits can be derived by from the effect of a configuration change to the CPL hierarchy itself. That is, the CPL/project hierarchy can be altered (e.g., by the user or a process) and the resulting impact determined on any CPLs lower in the hierarchy from the point of change with performance similar to changes in their own source files.

The first time this algorithm is invoked, the CPL searched is the project's. Subsequent recursive calls to the algorithm refer to the CPLs of other projects. In step 300, the source files of the CPL are searched for a matching type. If found, the information associated with the type is returned in step 304. Otherwise, a binary-path from the CPL selected in step 306. In one embodiment, binary-paths are selected in order of dependency. Next, an entry from the chosen binary-path is selected in step 308. If the selected entry is not a directory or a Java® Archive (JAR) file, it is determined in step 312 whether the entry is for a CPL. If so, the algorithm is invoked recursively with the CPL for the entry. If not, the algorithm resumes at step 320 where it is determined if there are any remaining entries to be searched in the chosen binary-path.

If the chosen entry is a directory or a JAR file, the corresponding directory or file is searched for a matching type in step 314. If found, the information associated with the type is returned in step 318. If not, it is determined in step 320 if there are any remaining entries (i.e., yet to be searched) in the chosen binary-path. If so, the process continues at step 308 with the selection of another entry. If not, it is determined in step 322 whether or not there are any remaining binary-paths to search in the current CPL. If so, the algorithm continues at step 306 by choosing another binary-path from the current CPL. If not, the process completes.

Figure 4:
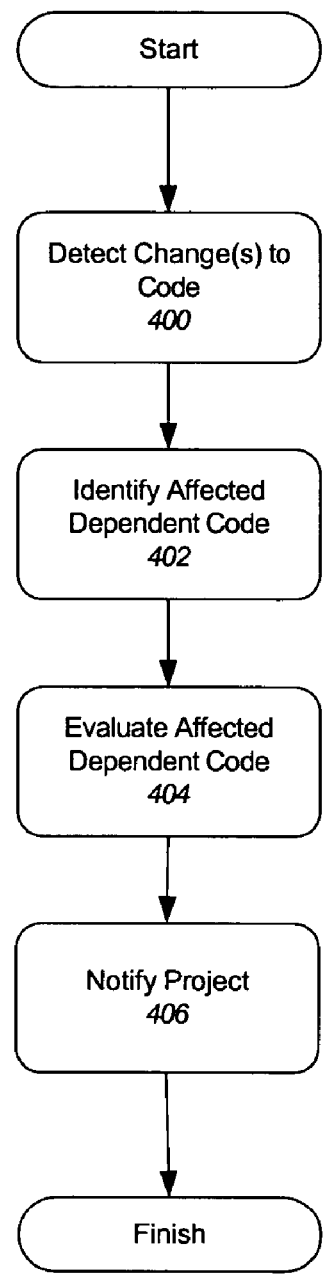
FIG. 4 is an exemplary illustration of a process for responding to changes in source code.

FIG. 4 is an exemplary illustration of a process for responding to changes in source code. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In various embodiments, the software analysis system monitors changes to the code registered for each project. In aspects of these embodiments, changes can be detected in step 400 when modified code is processed by the software analysis system. In one embodiment, processing code includes parsing and analyzing the code according to the syntax and semantics of a programming language and comparing the parsed representation to a previous parsed representation.

In step 402, the software analysis system traverses a project dependency data structure to determine which dependent source code is affected by the change. Once the dependent code is identified, the software analysis system can reevaluate the dependent code in step 404 within the context of the modifications and provide notification(s) to the associated project in step 406. A smart editor can then provide relevant information to the software developer, for example by highlighting a syntax error due to the modification of a method signature on a component.

Figure 5:
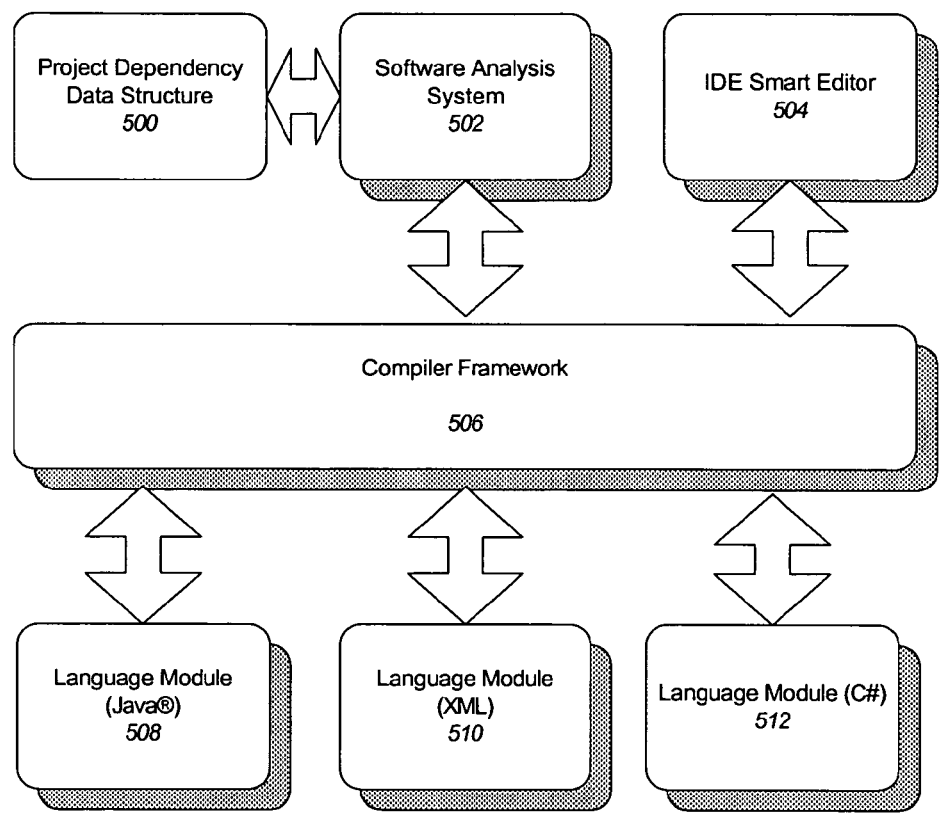
FIG. 5 is an exemplary illustration of a system in accordance to various embodiments.

FIG. 5 is an exemplary illustration of a system in accordance to various embodiments. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In various embodiments, a compiler framework 506 provides communication between language modules (508-512) for compiling source code and clients of information about the source code, such as IDEs with "smart" editors 504 used by the software developer. The IDE allows a software developer to create projects and specify dependencies between projects. The software analysis system 502 utilizes project dependency data structure 500 and causes code to be parsed and analyzed within a project, collects information about that code and presents that information to the IDE so the IDE can assist the software developer (e.g., in editor 504 by adding syntax coloring to the source code, statement completion, etc.).

In aspects of these embodiments, the software analysis system maintains a list of locations where internal components may be found for each project. The system allows clients to specify dependencies between projects by inserting references to other software projects within this list. In one embodiment, software developers can specify this information via an IDE. The IDE can in turn utilize an API to communicate the list to the software analysis system. In one embodiment, a setBinaryPaths API method allows the IDE (or other process) to specify the list of locations where internal components and external projects this project depends on can be found. The IDE may call this method passing a list of objects representing locations, which may include directory paths within the project, software libraries within the project or other objects implementing a CPL interface representing external projects. The objects representing external projects may contain similar lists of locations including additional objects representing the projects they depend upon.

In one embodiment, the order of the objects provided to the setBinaryPaths method is significant—the order defines the order in which the software analysis system searches internal components and external projects to find definitions of components used in the project. In one embodiment, the first definition of a component found in the locations on this list is used by the software analysis system and definitions from subsequent locations are ignored.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for locating the definition of a data type in a plurality of software projects, said method comprising:

searching, by an analysis system, source files of a first class path level node associated with a first software project in the plurality of projects for a definition of the data type;

selecting a binary path of the first class path level node in order of dependency;

selecting an entry from the selected binary path when the definition of the data type is not found in the source files of the first class path level node;

if the type of the entry is not a directory or a JAVA archive file associated with the first software project and if the entry is determined to be a second class path level node, recursively invoking said searching with the second class path level node for the entry to search the second class path level node associated with a second software project related to the first project when the definition of the data type is not found in the first project; and returning the definition of the data type when the definition is found, wherein a software project is a logical container for the code associated with a software application.

2. The method of claim 1 wherein the searching further includes: searching at least one of a directory; and a JAVA Archive File associated with the first software project.

3. The method of claim 1 wherein: the plurality of software projects form a directed acyclic graph.

4. The method of claim 1 wherein: software projects are related if one project uses an application programming interface for a component defined in another project.

5. An integrated software development environment, embodied on a computer readable medium, capable of performing the method of claim 1.

6. A machine readable medium having instructions stored thereon to cause a system to:

search source files of a first class path level node associated with a first software project in a plurality of projects for a definition of a data type;

select a binary path of the first class path level node in order of dependency;

select an entry from the selected binary path when the definition of the data type is not found in the source files of the first class path level node;

if the type of the entry is not a directory or a JAVA archive file associated with the first software project and if the entry is determined to be a second class path level node, recursively invoking said searching with the second class path level node for the entry to search the second class path level node associated with a second software project related to the first project when the definition of the data type is not found in the first project; and return the definition of the data type when the definition is found, wherein a software project is a logical container for the code associated with a software application.

7. The machine readable medium of claim 6, further comprising instructions to cause the system to: search at least one of: a directory; and a JAVA Archive File associated with the first software project.

8. The machine readable medium of claim 6 wherein: the plurality of software projects form a directed acyclic graph.

9. The machine readable medium of claim 6 wherein: software projects are related if one project uses an application programming interface for a component defined in another project.

10. A computer program embodied on a computer readable medium, the computer program configured to control a processor to execute:

a code segment including instructions for searching source files of a first class path level node associated with a first software project in the plurality of projects for a definition of the data type;

a code segment including instructions for selecting a binary path of the first class path level node in order of dependency;

a code segment including instructions for selecting an entry from the selected binary path when the definition of the data type is not found in the source files of the first class path level node;

if the type of the entry is not a directory or a JAVA archive file associated with the first software project and if the entry is determined to be a second class path level node, a code segment including instructions for recursively invoking said searching with the second class path level node for the entry to search the second class path level node associated with a second software project related to the first project when the definition of the data type is not found in the first project; and a code segment including instructions for returning the definition of the data type when the definition is found, wherein a software project is a logical container for the code associated with a software application.

* * * * *